No. 822,763. PATENTED JUNE 5, 1906.
J. PAULUS.
TROUGH FOR FEEDING AND WATERING STOCK.
APPLICATION FILED JULY 19, 1905.

Witnesses:
E. A. Lee
J. M. Milligan

Inventor:
John Paulus.

UNITED STATES PATENT OFFICE.

JOHN PAULUS, OF AFTON, IOWA.

TROUGH FOR FEEDING AND WATERING STOCK.

No. 822,763.  Specification of Letters Patent.  Patented June 5, 1906.

Application filed July 19, 1905. Serial No. 270,428.

*To all whom it may concern:*

Be it known that I, JOHN PAULUS, a citizen of the United States, residing at Afton, in the county of Union and State of Iowa, have invented certain new and useful Improvements in Troughs for Feeding and Watering Stock, of which the following is a specification.

My invention has reference to troughs for feeding and watering stock; and it has for its object the provision of a simple, inexpensive, and strong trough from which animals and poultry may conveniently eat or drink and one adapted to be conveniently moved from place to place and also adapted to withstand rough usage and exposure to the weather.

Other advantageous features of the invention will be fully understood from the following description and claim when the same are considered in connection with the accompanying drawings, forming part of this specification, in which—

Figure 1:
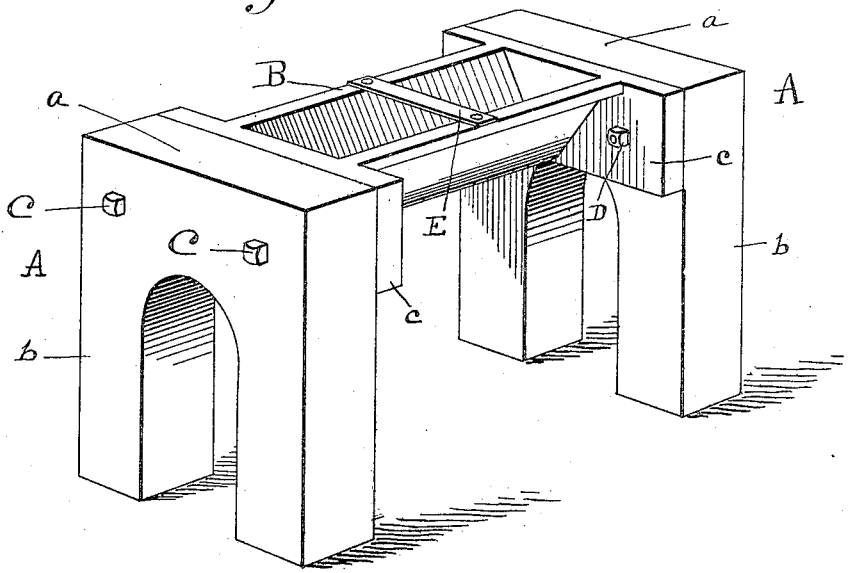
Figure 2:
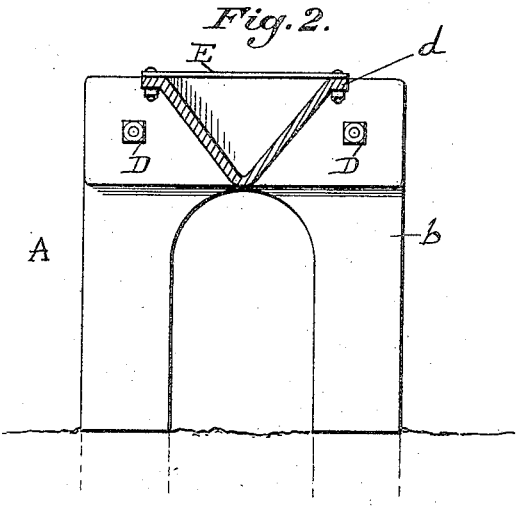

Figure 1 is a perspective view of a stock feeding and watering trough constituting one embodiment of my invention. Fig. 2 is a vertical transverse section of the trough, taken in a plane at one side of the transverse median line thereof; and Fig. 3 is a perspective view of a modified trough, the said modified trough being especially designed for feeding and watering swine and poultry.

Referring by letter to the said drawings, and more particularly Figs. 1 and 2 thereof, A A are the end supports of the stock feeding and watering trough. The said supports are of oak or other tough wood and are constructed as shown—*i. e.*, with thick and heavy bodies $a$ and corresponding legs $b$. Being of tough wood and made thick and heavy, the said supports are not only adapted to withstand rough usage and weather, but are also adapted to resist efforts of stock to overturn the trough or move the same about the barnyard or other inclosure. B is a food or water receptacle interposed between the body portions $a$ of the supports A. The said receptacle is of metal and is made V shape in cross-section, Fig. 2, so as to permit of its being expeditiously and thoroughly cleared of stale food, dirt, &c. At its ends the receptacle is provided with vertically-disposed walls $c$, arranged at right angles to its length. These walls $c$ serve to close the ends of the receptacle, and they also serve by extending laterally in opposite directions from the ends of the receptacle and resting at the inner sides of the supports A with their upper edges flush with those of the supports to lend strength and durability to said supports A and lessen the liability of the same being split or broken when the trough is knocked over or thrown or moved about. C C are bolts which extend through the bodies $a$ of the supports A and the extended portions of the walls $c$ and serve to fixedly and strongly connect the latter to the former, and D D are nuts mounted on said bolts, preferably the inner ends thereof, as shown. E is a metallic partition-strip arranged on the receptacle B at the middle thereof and having for its purpose to prevent one animal from interfering with another while in the act of eating or drinking. The said partition-strip is bolted to the flanges $d$, with which the receptacle B is preferably provided, as best shown in Fig. 2 of the drawings.

The embodiment of my invention described in the foregoing is designed more particularly for feeding and watering calves, sheep, and similar stock, and it will obviously be found in practice very convenient for the purpose. It will also be noted that the said embodiment of the invention while quite tall is not liable to be casually knocked over and is also not likely to be injured by rough handling or exposure to the weather.

Figure 3:
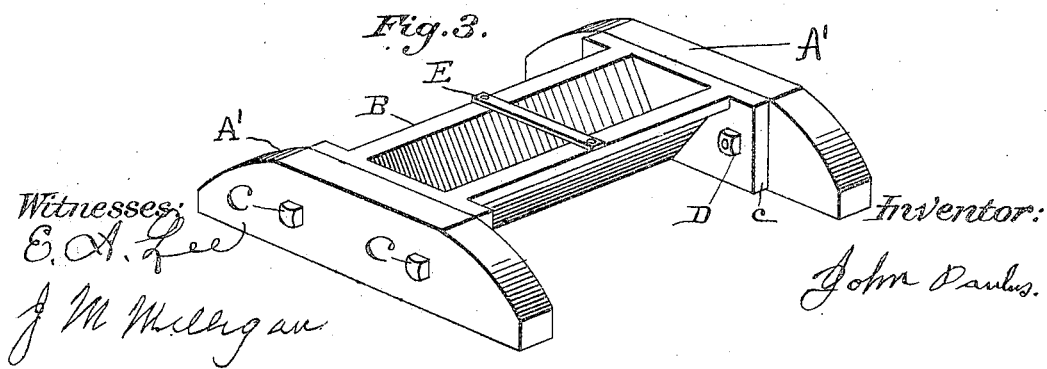

The embodiment of the invention shown in Fig. 3 is designed, as before stated, for feeding and watering swine and poultry. The said embodiment is similar to that shown in Figs. 1 and 2, except that its supports A' are low, being merely blocks of oak wood or other tough wood suitable to the purposes of the invention.

By resting flush with the upper edges of the wood supports the upper edges of the end walls on the metallic receptacle protect the upper edges of the supports and prevent chipping or cracking of the same in the event of the trough being forcibly thrown over on its top, as frequently happens in practice.

I claim—

A stock feeding and watering trough comprising thick and heavy end supports of wood, a receptacle formed of one piece of metal interposed between the supports and resting throughout its length flush with the upper edges thereof; said receptacle being of V shape in cross-section and having an unbroken or smooth interior even surface to permit of its being easily cleaned and being provided with integral end walls extending throughout its height and also extending laterally in opposite directions from its ends and disposed against the inner sides of the supports, and bolts extending through and connecting the extended portions of the end walls of the receptacle and the supports.

JOHN PAULUS.

Witnesses:
   J. M. MILLIGAN,
   E. A. LEE.